Dec. 19, 1967  H. A. RAPHAEL  3,359,538
PENDULUM TYPE SEISMOGRAPH
Filed Aug. 22, 1966

POWER SOURCE
TO RECORDER

INVENTOR.
HAROLD A. RAPHAEL
BY
ATTORNEY

United States Patent Office 3,359,538
Patented Dec. 19, 1967

3,359,538
PENDULUM TYPE SEISMOGRAPH
Harold A. Raphael, Bellflower, Calif., assignor to Harold A. Raphael, Jr., and David A. Raphael
Filed Aug. 22, 1966, Ser. No. 573,931
4 Claims. (Cl. 340—17)

ABSTRACT OF THE DISCLOSURE

To record seismograph disturbances a pendulum type recorder is constructed with Foucault type pendulum. The pendulum is electromagnetically driven and any deviation from the normal oscillation of the pendulum is recorded to thus determine the amount of seismograph disturbance within the earth.

---

This invention relates to a pendulum type seismograph and this pendulum may be Foucault or Foucault type pendulum.

An object of my invention is to provide a pendulum type seismograph, preferably electromagnetically driven, and which will constantly record the sweep of the pendulum and also any deviation from the normal sweep or oscillation of the pendulum, as when a vibration or other disturbance occurs in the earth, or on the structure upon which the pendulum may be mounted.

Another object of my invention is to provide a pendulum type seismograph in which the pendulum moves over a driving magnet, thus cutting the magnetic lines of force of the magnet to induce a current which actuates a voltmeter acting as a recorder.

Another object of my invention is to provide a novel pendulum type seismograph in which the driving magnet may be energized by an electrical coil surrounding the same, and the pendulum may contain a coil, which coils may be both alternately energized and deenergized as the pendulum swings in an arc.

Another object of my invention is to provide a novel pendulum type seismograph in which the electrical current induced by oscillation of the pendulum is collected in a search coil, which then transmits the induced current to a voltmeter which acts as a recorder.

Still another object of my invention is to provide a novel pendulum type seismograph in which electrical current is connected to a coil in the pendulum and a coil surrounding the driving magnet at the maximum outer swing of the pendulum, and this current being shut off during the center portion of the swing of the pendulum.

Other objects, advantages and features of invention may appear from the accompanying drawing, the subjoined detailed description and the appended claims.

Figures 1, 2, 3, 4:
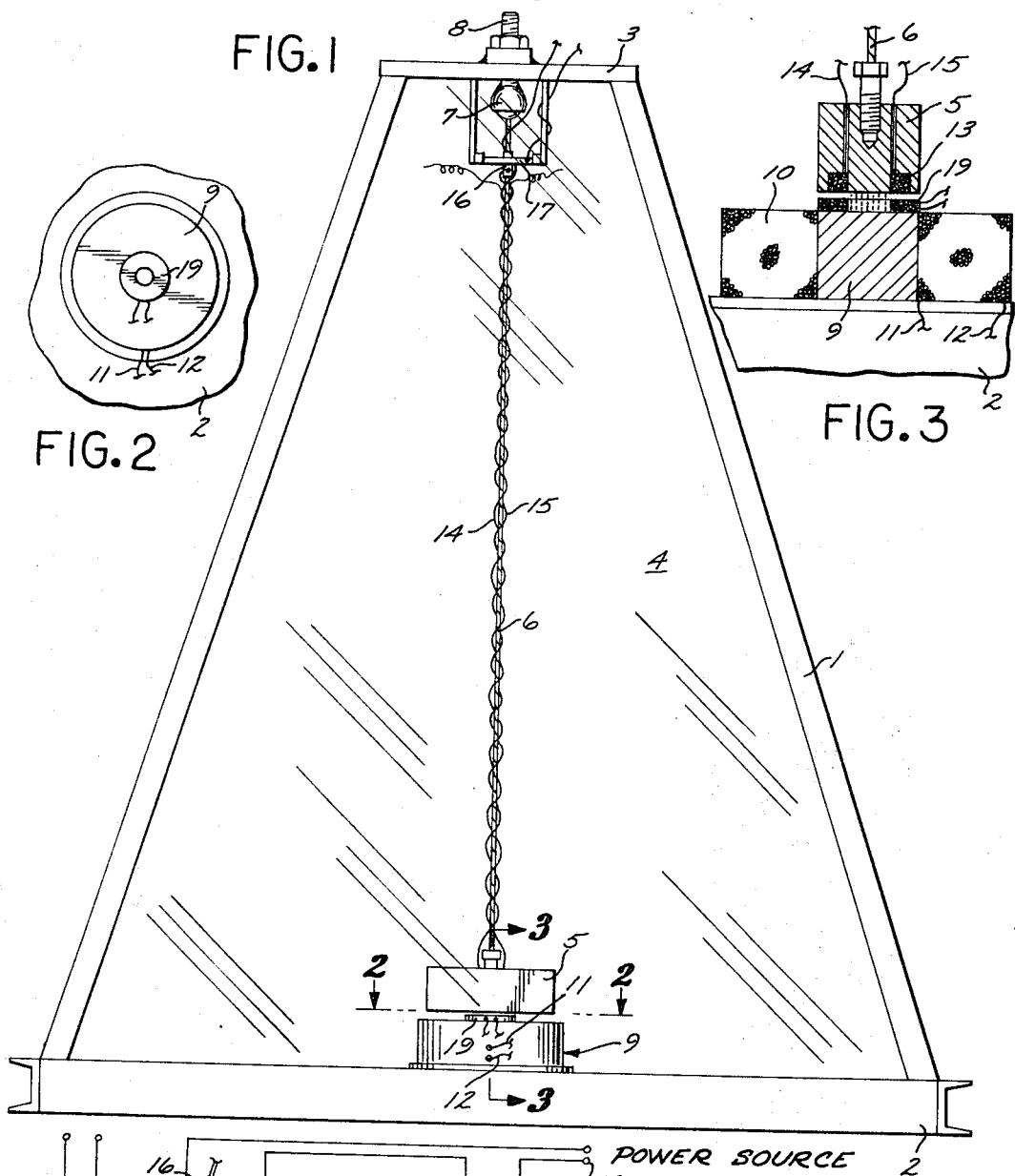
FIGURE 1 is a side elevation of my pendulum type seismograph mounted in one type of appropriate frame.
FIGURE 2 is a plan view of the driving magnet as taken from line 2—2 of FIGURE 1.
FIGURE 3 is a sectional view taken on line 3—3 of FIGURE 1.
FIGURE 4 is a diagrammatic wiring diagram of the seismograph.

Referring more particularly to the drawing, the numeral 1 indicates a heavy rigid frame which includes a base 2, which base can be mounted on the ground or on a suitable structure, such as a dam or other structures, which may be observed for excessive vibrations or earthquakes, or the like. The frame 1 also includes a top plate 3 from which the pendulum is suspended, as will be subsequently described. A suitable covering or protective sheet 4 is mounted on the frame 1 to prevent any wind or air movement from interfering with the normal oscillation of the pendulum.

A pendulum 5 is formed of soft iron or mild steel, or may be laminated in the nature of the armature of an electrical motor. The pendulum 5 is attached to the lower end of a suspension cable 6 which extends to a ball joint 7. The ball joint 7 includes a threaded post 8 which is threaded through the top plate 3 to permit the pendulum 5 to be adjusted vertically so that it will not strike the driving magnet 9, but will move freely above the driving magnet without any contact. Once the ball joint 7 has been properly adjusted the pendulum 5 will continue to swing correctly and freely in the nature of a pendulum, and particularly a Foucault type of pendulum. Under normal conditions, and where there is no vibration or earth disturbance of any kind, the Foucault pendulum will accurately swing over a central point in the oscillation pattern, but any vibration or earth movement will deflect the pendulum from its normal pattern, and the amount of deflection from the normal pattern is an indication of the severity of the vibration or earth movement.

The driving magnet 9 is fixedly mounted on the base 2 and at the exact center of the pattern traced by the pendulum 5. An electrical coil 10 surrounds the driving magnet 9 and this electrical coil is included in a circuit by means of the electrical leads 11 and 12. An electrical coil 13 is positioned in the bottom of the pendulum 5 and one face of that coil is on the bottom of the pendulum 5. The coil 13 is connected to an electrical circuit by means of the leads 14–15. The leads 14–15 are wrapped around the cable 6 and extend to the top of that cable.

The contact 16 is positioned within a ring 17 and contacts that ring at each extreme outward movement of the pendulum 5. The lead 11 is connected at one end to the ring 17 and the lead 12 extends to a power source 18 which supplies electrical energy to the coil 10.

A search coil 19 rests on top of the driving magnet 9 and is, therefore, stationary. The search coil 19 is connected to the leads 20–21 to a voltmeter 22 which acts as a recorder. The pendulum will function without a search coil 19; however a higher voltage is obtained with a search coil and, consequently, small variations in the movement of the needle of the recorder 22 can be observed because of the higher voltage.

*In operation*

The pendulum 5 is pushed to one side and then released to start its oscillatory movement. The extreme outward movement of the pendulum 5 will cause the contact 16 to engage the ring 17, and this will direct an electrical charge to the coil 10 and magnetizing the driving magnet 9. As the pendulum 5 swings towards the magnet 9 it will cut the lines of force 23 of the magnet 9, and also inducing a current in the coil 19 which will be recorded on the voltmeter 22. As the contact 16 moves away from the ring 17 the electrical circuit to the coil 10 is broken, thus permitting the pendulum 5 to swing without restraint in its normal path, until the opposite position of the pendulum is reached when the contact 16 again engages the ring 17, whereupon the magnet 9 is reenergized to attract the coil 13 and thus exert the necessary small amount of power to continue the oscillation of the pendulum 5, and also the pendulum will be oscillated by earth movement as in the case of a Foucault pendulum. If there is an earth tremor the normal path of the pendulum 5 will be disrupted; consequently, the pendulum will not cut the lines of force 23 in a normal manner but will be deflected somewhat, thus causing a lesser voltage to be recorded at 22, the amount of diminution indicating the severity of the earth movement.

Having described my invention, I claim:

1. A pendulum type seismograph comprising a pendulum weight, means suspending the pendulum weight for oscillatory movement, a driving magnet fixedly mounted below the pendulum weight, electrical means coupling the pendulum weight and the driving magnet, recording means in said electrical means to record regular and irregular oscillation of the pendulum weight, said driving magnet including a coil surrounding the magnet and an electrical coil in the pendulum weight, a switch means operable by the pendulum to turn the electrical current on and off in said electrical means, said switch means including a contact ring surrounding the means suspending the pendulum weight, said contact ring being included in the electrical means coupling the pendulum weight and the driving magnet.

2. A pendulum type seismograph comprising a pendulum weight, means suspending the pendulum weight for oscillatory movement, a driving magnet fixedly mounted below the pendulum weight, electrical means coupling the pendulum weight and the driving magnet, and recording means in said electrical means to record regular and irregular oscillation of the pendulum weight, said driving magnet including a coil surrounding the magnet and an electrical coil in the pendulum weight, said recording means including a search coil interposed between the coil in the driving magnet and the coil in the pendulum weight.

3. A pendulum type seismograph comprising a pendulum weight, means suspending the pendulum weight for oscillatory movement, a driving magnet fixedly mounted below the pendulum weight, electrical means coupling the pendulum weight and the driving magnet, and recording means in said electrical means to record regular and irregular oscillation of the pendulum weight, said driving magnet including a coil surrounding the magnet and an electrical coil in the pendulum weight, said recording means including a search coil interposed between the coil in the driving magnet and the coil in the pendulum weight, and a switch means operable by the pendulum to turn the electrical current on and off in said electrical means.

4. A pendulum type seismograph comprising a pendulum weight, means suspending the pendulum weight for oscillatory movement, a driving magnet fixedly mounted below the pendulum weight, electrical means coupling the pendulum weight and the driving magnet, and recording means in said electrical means to record regular and irregular oscillation of the pendulum weight, said driving magnet including a coil surrounding the magnet and an electrical coil in the pendulum weight, said recording means including a search coil interposed between the coil in the driving magnet and the coil in the pendulum weight, and a switch means operable by the pendulum to turn the electrical current on and off in said electrical means, said switch means including a contact ring surrounding the means suspending the pendulum weight, said contact ring being included in the electrical means coupling the pendulum weight and the driving magnet.

References Cited

UNITED STATES PATENTS

| | | | |
|---|---|---|---|
| 2,424,724 | 7/1947 | Tolk | 177—352 |
| 3,212,057 | 10/1965 | Romberg | 340—17 |
| 3,222,636 | 7/1965 | Melton | 340—17 |

BENJAMIN A. BORCHELT, *Primary Examiner.*

P. A. SHANLEY, *Assistant Examiner.*